May 24, 1960 A. J. STEPHENS 2,937,685
VALVE STEM LOCKS
Filed Feb. 9, 1959
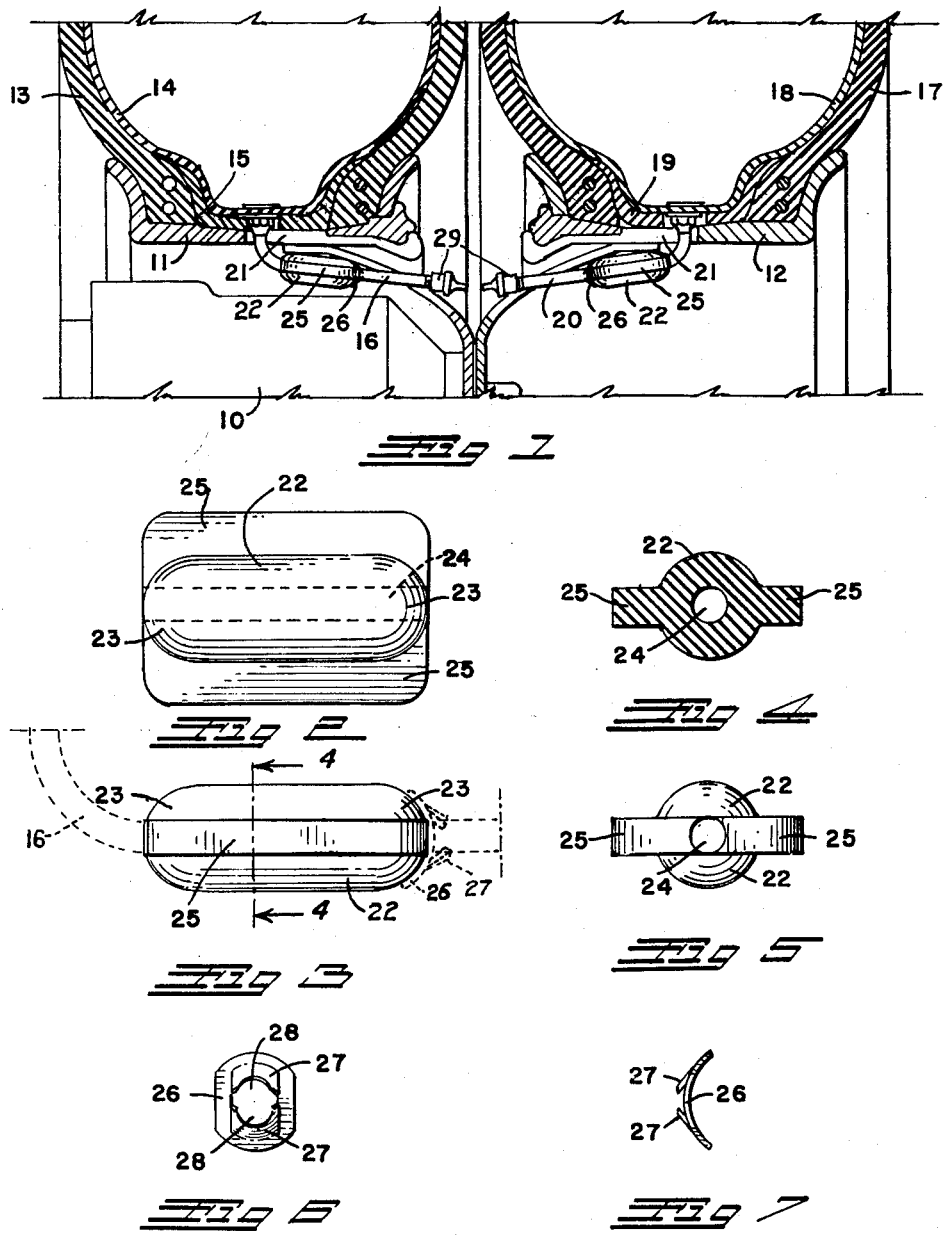
INVENTOR.
ALLEN J. STEPHENS
BY
ATTORNEY

United States Patent Office 2,937,685
Patented May 24, 1960

2,937,685

VALVE STEM LOCKS

Allen J. Stephens, Denver, Colo., assignor to The Mechanex Corporation, Denver, Colo., a corporation of Colorado Filed Feb. 9, 1959, Ser. No. 792,183

2 Claims. (Cl. 152—427)

This invention relates to a valve stem lock for automotive tires more particularly for dual wheel truck tires. Dual wheel truck tires of the tube type are mounted on wheel rims provided with axially extending slots through which the valve stems are passed when the casings are positioned upon the rims. Occasionally a tire will become deflated without knowledge of the driver. If the deflated tire be upon the rim of a dual wheel, it is difficult to discover the deflation until a check station is reached on the route. As a result, the valve of the deflated tire will be drawn through the valve slot of the rim into the interior of the tire where it will rapidly cut through the inner wall and cords of the casing to completely destroy both the casing and tube. The friction caused by the rotating, tearing and cutting action of a floating valve stem within a deflated tire often creates sufficient heat to weld the tube and the rim flap of a casing together to the destruction of both.

The principal object of this invention is to provide a neat, simple, inexpensive, easily used and highly efficient locking device which can be quickly and easily placed upon the valve stem of a tire after the casing is in place on the rim and which will absolutely prevent withdrawal of the valve stem through the rim slot and into the interior of the casing should the tire become deflated.

Another object of the invention is to so construct the protective device that it can be quickly and easily installed by hand without the use of tools of any kind so that it can be readily and easily positioned in difficultly accessible locations in the wheel.

A further object is to provide a valve lock which will be completely formed from a single rubber unit so that all noise, vibration and rim damage will be prevented.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a fragmentary cross section through the rim portion of a conventional automotive type dual wheel showing the invention in place on the valve stems of the tires of the wheels;

Fig. 2 is a top view of the improved valve lock;

Fig. 3 is a side view thereof showing in broken line the position of a valve stem therein and a locking washer thereon;

Fig. 4 is a cross section taken on the line 4—4, Fig. 3;

Fig. 5 is an end view thereof;

Fig. 6 is a face view of an auxiliary lock washer for use on the improved valve lock; and Fig. 7 is an edge view of the lock washer of Fig. 6.

The invention is applicable to the valve stem of any type of pneumatic tire. It is, however, more particularly valuable when applied to the valve stems of dual wheels of the type used in trucks and busses. For the purpose of description, it will be described as applied to such a dual wheel as illustrated in Fig. 1.

In the latter figure, conventional elements of a dual wheel are designated by numeral as follows: brake drum 10; inner dual wheel rim 11; outer dual wheel rim 12; inner dual tire casing 13, with its inner tube at 14, rim flap at 15, and valve stem at 16; and outer dual tire casing 17 with its inner tube at 18, rim flap at 19 and valve stem at 20. The valve stems 16 and 20 are provided with the usual valve caps 29. The rims 11 and 12 are conventional and are provided with axially extending valve stem rim slots 21 to provide clearance for the valve stems 16 and 20 as the tires are forced onto the rims. This invention is designed to prevent the valve stems from being drawn outwardly through the valve slots 21 and into the interior of the casings when the latter becomes deflated.

Briefly, the invention comprises a molded rubber block 22, such as tough tread stock rubber, having an axial passage 24 to enable it to be slid over the valve stems so as to increase the size of the latter sufficiently so that they cannot be drawn outwardly through the rim slots 21.

The molded rubber block 22 is shaped to form an enlarged, cylindrical, medial portion, having spherically rounded extremities 23 through which the axial passage 24 extends and two side wing portions 25 which extend oppositely outward from the cylindrical portion to increase the width of the block sufficiently so that it could not possibly pass through the slot 21 in the rim. After a casing is in place on its rim, the pre-molded rubber block is simply forced over the valve stem to a position adjacent the rim slot 21, as shown in Fig. 1, and is turned to position the wing portions 25 transversely of the length of the rim slot.

The passage 24 is preferably slightly smaller in diameter than the valve stem so that when forced into position, the block will naturally retain itself in place due to the frictional gripping effect of its inherent elasticity. In fact, the valve caps 29 would, if necessary, prevent the valve stems from being withdrawn through the rubber blocks 22. However, to insure that the block 22 will retain itself in position on the valve stem, a flexibly resilient, concave locking washer 26, such as illustrated in Figs. 6 and 7, is forced over the valve stem and tightly against the outer extremity of the block, as shown in Fig. 1 and as shown in broken lines in Fig. 3.

The locking washer 26 comprises a circular, concave metallic disc of spring metal from the convex face of which two, ratchet-like, gripping prongs 27 are stamped. The prongs project tangentially from the convex face of the washer 26, as shown in Fig. 7, and each prong is provided with a semi-circular notch 28 for receiving the side of the valve stem. As the locking washer is forced into place, the prongs 27 are flexed outwardly and the entire washer is flexed inwardly to snugly enclose the rounded end 23 of the rubber block 22 and so as to engage the sides of the valve stem with a ratchet-like action. The locking washer not only prevents longitudinal movement of the block 22 on the valve stem, but also prevents rotational movement thereof so that the wing portions 25 will always remain transverse of the rim slot 21.

It can be readily seen that should a tube become deflated, it will be impossible for the valve stem thereof to pull through the rim slot 21 into the interior of the casing so that all floating valve stem damage is eliminated. It can also be seen that the block 22 and its locking washer 26 can simply be slid into position by hand, no tools being required, and they can be quickly removed, when necessary, by simply compressing the locking washer 26 transversely, so as to tilt the locking prongs 27 outwardly away from the valve stem, to allow the washer and the rubber block to be pulled from the stem.

While a specific form of the improvement has been described and illustrated herein, it is to be understood that the same may be varied within the scope of the appended claims, without departing from the spirit of the invention.

Having thus described the invention what is claimed and desired secured by Letters Patent is:

1. In combination with a vehicle wheel having a rim and a slot therefor and a tire having a valve stem extending through said slot, a lock for precluding the withdrawal of the valve stem through said slot into the tire upon deflation of the tire, said lock comprising a molded rubber block having an enlarged cylindrical medial portion with spherical rounded extremities and side wing portions extending from said medial portion, said block having an axial passage through said medial portion through which said valve stem is inserted, the passage being of a diameter tightly to grip said valve stem, said wings and medial portion being of a width and length in excess of the dimensions of said slot.

2. The structure of claim 1 wherein a locking washer is positioned against the outer spherically rounded extremity of said medial portion engaging said stem to resist removal of said block therefrom.

References Cited in the file of this patent

UNITED STATES PATENTS

| | | |
|---|---|---|
| 2,568,584 | Hartman | Sept. 18, 1951 |
| 2,604,364 | Ward | July 22, 1952 |
| 2,651,199 | Collins et al. | Sept. 8, 1953 |

FOREIGN PATENTS

| | | |
|---|---|---|
| 1,150,557 | France | Aug. 12, 1957 |